United States Patent
Lu

(10) Patent No.: US 11,190,964 B2
(45) Date of Patent: Nov. 30, 2021

(54) ADAPTIVE MEASUREMENT REPORT TIMING FOR RADIO CONNECTIVITY

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 99 days.

(21) Appl. No.: 16/700,895

(22) Filed: Dec. 2, 2019

(65) Prior Publication Data

US 2021/0168640 A1 Jun. 3, 2021

(51) Int. Cl.
*H04W 24/10* (2009.01)
*H04B 17/318* (2015.01)

(52) U.S. Cl.
CPC .......... *H04W 24/10* (2013.01); *H04B 17/318* (2015.01)

(58) Field of Classification Search
CPC ............................ H04W 24/10; H04B 17/318
See application file for complete search history.

(56) References Cited

U.S. PATENT DOCUMENTS

| | | | |
|---|---|---|---|
| 2013/0235738 A1* | 9/2013 | Siomina | H04L 5/0053 370/252 |
| 2015/0195731 A1* | 7/2015 | Jung | H04L 5/0048 370/252 |
| 2017/0150384 A1* | 5/2017 | Rune | H04W 72/085 |
| 2019/0174341 A1* | 6/2019 | Chincholi | H04W 24/10 |
| 2021/0014893 A1* | 1/2021 | Park | H04W 72/02 |

* cited by examiner

*Primary Examiner* — Jamal Javaid
*Assistant Examiner* — Ryan C Kavleski
(74) *Attorney, Agent, or Firm* — Lee & Hayes, P.C.

(57) ABSTRACT

Systems and methods discussed herein are directed to adapting signal strength measurement and corresponding signal strength measurement report scheduling for attaching an electronic device configured as a non-standalone (NSA) device to a new radio (NR) base station of a wireless communication network, e.g., a base station configured according to 5G operating protocols. In particular, an initial schedule for signal strength measurement and corresponding signal strength measurement reporting for attaching the electronic device to the NR base station may be adapted or altered, according to a predetermined pattern. For example, the pattern may be a two to the power of N based pattern.

14 Claims, 5 Drawing Sheets

| Time Period | Report Point | Schedule | Adapted Schedule |
|---|---|---|---|
| T1 | 1 | Report | Report |
| T1 | 2 | Report | |
| T1 | 3 | Report | Report |
| T1 | 4 | Report | |
| T1 | 5 | Report | |
| T1 | 6 | Report | Report |
| T1 | 7 | Report | |
| T1 | 8 | Report | |
| T2 | 1 | Report | |
| T2 | 2 | Report | |
| T2 | 3 | Report | Report |
| T2 | 4 | Report | |
| T2 | 5 | Report | |
| T6 | 6 | Report | |
| T2 | 7 | Report | |
| T2 | 8 | Report | |
| T3 | 1 | Report | |
| T3 | 2 | Report | |
| T3 | 3 | Report | |
| T3 | 4 | Report | Report |
| T3 | 5 | Report | |
| T3 | 6 | Report | |
| T3 | 7 | Report | |
| T3 | 8 | Report | |
| T4 | 1 | Report | |
| T4 | 2 | Report | |
| T4 | 3 | Report | |
| T4 | 4 | Report | |
| T4 | 5 | Report | Report |
| | | | RRC Reconfiguration Message |

FIG. 2

ADAPTIVE MEASUREMENT REPORT TIMING FOR RADIO CONNECTIVITY

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile communication devices, such as, for example, smart phones, portable computers, notebooks, laptops, etc., and other types of computing devices, both mobile and stationary, often communicate with other entities, e.g., servers, other similar devices, etc., over the Internet via wireless communication networks.

Wireless communication networks continue to evolve to provide better quality of service and user experience as the number of electronic devices operating within wireless communication networks increases. Thus, there are various operating protocols and operating standards that have been developed, and continue to be developed, for wireless communication networks. For example, there are standards related to third generation (3G), Long Term Evolution (LTE), fourth generation (4G), and fifth generation (5G) operating protocols. Often, electronic devices may be configured as non-standalone devices so that they may operate using different operating protocols within wireless communication networks. For example, an electronic device may be capable of operating according to 3G operating protocols, LTE operating protocols, 4G operating protocols, 5G operating protocols, as well as other operating protocols. Many of the operating protocols have been developed and/or adopted by the Third Generation Partnership Project (3GPP).

As the newest 5G operating protocols (new radio (NR)) are implemented, wireless communication devices that are capable of operating within wireless communication networks according to 5G operating protocols are being used by people. Such wireless communication devices (often referred to as non-standalone (NSA) devices) are generally capable of operating according to both LTE operating protocols and NR operating protocols, as well as other operating protocols.

Generally, a NSA wireless communication device may first attach to a base station operating within a wireless communication network, where the base station is configured to operate according to LTE operating protocols. The wireless communication device may then wish to attach to a base station configured to operate according to NR (5G) protocols. This attachment may be instead of or in addition to the attachment to the LTE base station.

In order to attach to the NR base station, the wireless communication device needs to have a strong enough signal level with respect to the NR base station. In particular, the wireless communication device needs to meet the B1 threshold (minimum signal requirement) as generally defined by the Institute of Electrical and Electronics Engineers (IEEE). Thus, in 5G networks, especially in evolved-universal terrestrial radio access new radio dual connectivity (ENDC), before the wireless communication device can attach to the NR base station, the wireless communication network will configure the wireless communication device to do periodic NR signal strength measurements and send measurement reports to the LTE base station. If the NR signal strength meets or exceeds the threshold signal level, then the LTE base station will send a radio resource control (RRC) reconfiguration message to the wireless communication device. If the measured signal strength does not meet the threshold signal level, or due to some other reason that wireless communication network does not send RRC reconfiguration message to configure the wireless communication device to add the NR link, then the wireless communication device will take another signal measurement at a next scheduled report point and forward another measurement report to the LTE base station. This continues until the wireless communication device meets or exceeds the threshold signal level; or the wireless communication device might continue to do so if there is no RRC reconfiguration message received to stop the measurement and corresponding reporting.

Generally, there are about eight measurements and corresponding measurement reports per second, e.g., about 120 milliseconds between measurement points. In some situations, if the wireless communication device does not quickly meet the threshold signal level, or even if it meets the threshold but no follow up RRC reconfiguration message to stop this measurement and add NR link is received, then the number of measurements and reports can become quite large. This is not good in that it can lead to the battery of the wireless communication device becoming hot. Additionally, this can lead to quick drainage of the power level of the battery. Also this can increase the air-interface interference.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a chart for the adaptive scheduling of signal strength measurements and corresponding signal strength measurement reports for UEs in the wireless communication network of FIG. 1, in accordance with various configurations.

DETAILED DESCRIPTION

Figure 1:
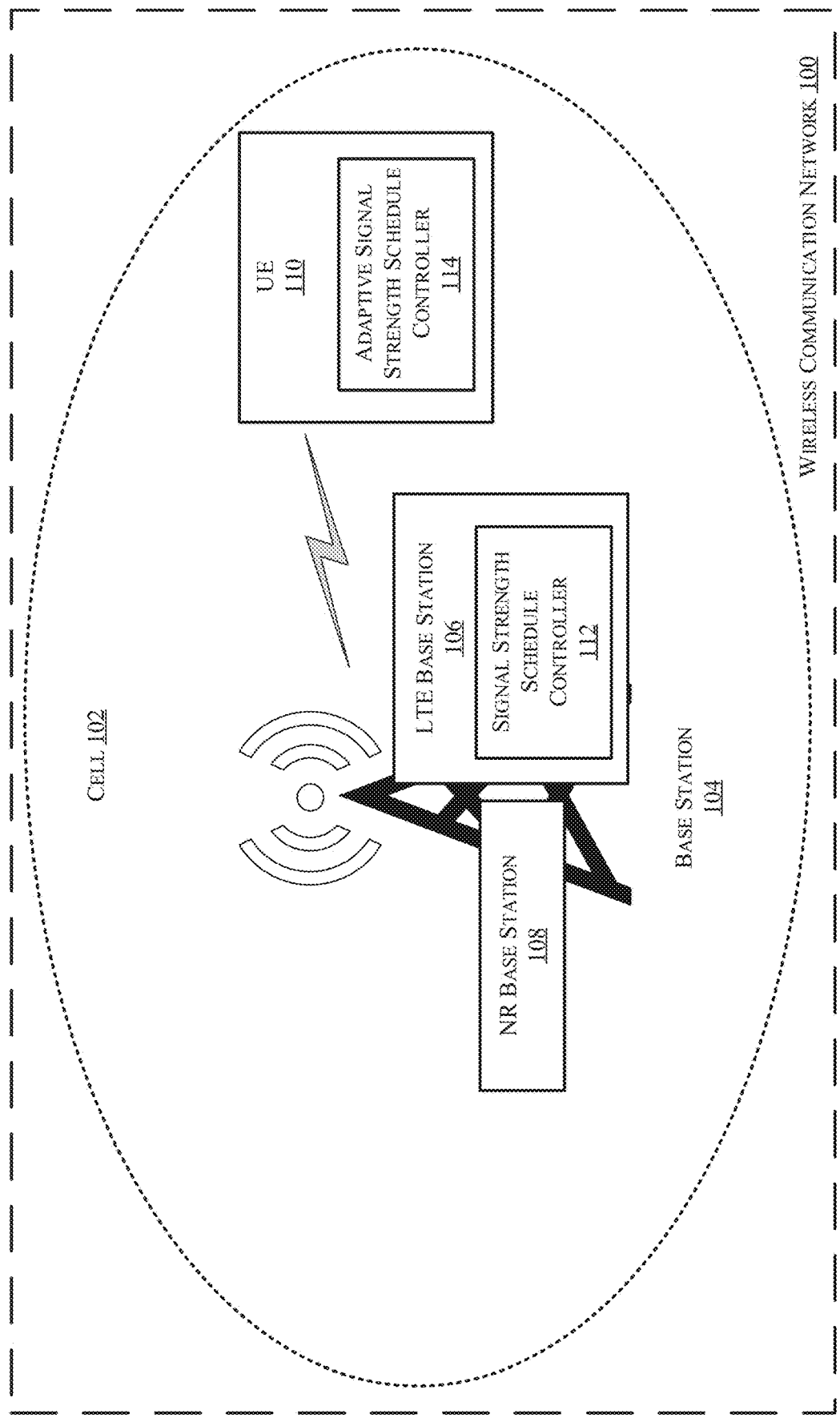
FIG. 1 schematically illustrates a cell of a wireless communication network, in accordance with various configurations.

Techniques and architecture are described herein for adapting signal strength measurement and corresponding signal strength measurement report scheduling for attaching an electronic device configured as a non-standalone (NSA) device to a new radio (NR) base station of a wireless communication network, e.g., a base station configured according to 5G operating protocols. In particular, a schedule for signal strength measurement and corresponding signal strength measurement reporting for attaching the electronic device to the NR base station of the wireless communication network may be adapted or altered, according to a predetermined pattern. For example, the pattern may be a two to the power of N based pattern. In configurations, N may be limited to a number such as, for example, three, so that the electronic device will not skip too many measurements and corresponding reports and thereafter miss the opportunity to attach to the NR base station. While the techniques and architecture are described herein with respect to signal strength measurements and signal strength measurement reports with respect to attaching electronic devices to NR base stations, the techniques and architecture are also applicable to signal strength measurements and corresponding signal strength measurement reports with respect to other measurement report triggering events.

For example, when the electronic device operates within a cell of the wireless communication network, the electronic device may initially interact with a LTE base station of the cell for both calls and data transmission, e.g., the LTE base station is configured according to LTE operating protocols. The electronic device may desire to interact with both a NR base station of the cell and the LTE base station. Thus, in configurations, the LTE base station determines if the signal strength between the electronic device and the NR base station meets or exceeds a threshold.

The LTE base station may control signal strength measurements by the electronic device and corresponding signal strength measurement reports that are needed to determine if the electronic device has a strong enough signal with respect to the NR base station. Thus, when the electronic device wishes to attach to the NR base station, the LTE base station preliminarily configures the UE 110 for attachment to the NR base station, as is known. The LTE base station may provide an original signal strength measurement schedule for obtaining signal strength measurement reports from the electronic device with respect to the NR base station. For example, the scheduling of the signal strength measurement reports may be about once every 120 milliseconds, e.g., about eight per second. Other schedules may be used if desired. Additionally, the electronic device may be configured with the original signal strength measurement schedule.

In configurations, the electronic device includes an adaptive signal strength schedule controller. The adaptive signal strength schedule controller may adapt or alter the original signal strength measurement schedule provided by the LTE base station. The adaptive signal strength schedule controller may be included on the electronic device in the form of an application, e.g., an app. In configurations, the adaptive signal strength schedule controller may be included or be part of the LTE base station.

Thus, in configurations, the LTE base station may provide an original signal strength measurement schedule of receiving signal strength measurement reports from the electronic device about every 120 milliseconds until the signal strength meets or exceeds a signal strength threshold with respect to the NR base station. For example, the electronic device may take a signal strength measurement with respect to the NR base station. The electronic device will then send a corresponding signal strength measurement report at a first reporting point of the original signal strength measurement schedule to the LTE base station.

If, according to the signal strength measurement report, the signal strength measurement meets or exceeds the signal strength threshold, e.g., the B1 threshold defined by IEEE, then the LTE base station may send a RRC reconfiguration message to the electronic device to stop such B1 measurement and configure the electronic device to add the NR Link. The electronic device may then stop taking signal strength measurements and sending corresponding signal strength measurement reports. However, if the electronic device does not receive the RRC reconfiguration message for some reason, e.g., the signal strength did not meet the threshold or an error occurred, then the electronic device will continue to take the signal strength measurements and send the corresponding signal strength reports. Thus, the electronic device will take another signal strength measurement and send another signal strength measurement report.

However, in accordance with configurations, the adaptive signal strength measurement controller adapts or alters, according to a predetermined pattern, the original signal strength measurement schedule. For example, the pattern may be a two to the power of N based pattern. Thus, for the second measurement, the UE may skip a number of measurement reporting points. In the current two to the power of N example, since this will be the first subsequent signal strength measurement and corresponding signal strength measurement report, the electronic device may skip two to the power of zero ($2^0$), e.g., one, reporting point. Thus, the electronic device will take another signal strength measurement and send another corresponding signal strength measurement report at the third measurement point of the original signal strength measurement schedule, e.g., the second measurement point of the original signal strength measurement schedule will be skipped.

If the electronic device does not receive a RRC reconfiguration message in response to the subsequent signal strength measurement report, then the electronic device may wait or skip a number of reporting points based upon two to the first power ($2^1$), e.g., two reporting points. Thus, the subsequent signal strength measurement and corresponding signal strength measurement report may be sent after skipping two reporting points of the original signal strength measurement schedule. This may be repeated until a RRC reconfiguration message is received and the powers of two may increase until N is reached, at which time two to the N power ($2^N$) reporting points of the original signal strength measurement schedule will be skipped in between each signal strength measurement and corresponding signal strength measurement report until the RRC reconfiguration message is received. Once the RRC reconfiguration message is received, the UE 110 will stop taking signal strength measurements and stop sending signal strength measurement reports. The UE 110 may then complete attachment to the NR base station 108, as is known.

FIG. 1 schematically illustrates a cell 102 of a wireless communication network 100. The cell 102 generally represents one of many cells within the wireless communication network 100. However, only a single cell 102 is depicted in FIG. 1 for clarity.

The cell 102 includes a base station 104 that is configured to operate according to LTE protocols and NR (5G) protocols, e.g., the base station 104 includes co-located LTE and NR base stations 106, 108, respectively, on a single tower. Thus, the LTE base station 106 includes a radio configured according to LTE protocols and the NR base station 108 includes a radio configured according to NR (5G) protocols. In configurations, the LTE base station 106 and the NR base station 108 may be located in separate base stations, e.g., on different towers.

A UE 110 is illustrated. The UE 110 is configured to operate within the wireless communication network 100 according to 5G operating protocols. The UE 110 is also configured to operate according to LTE operating protocols and may be configured to operate according to other operating protocols. The UE 110 may also be configured to operate according to other operating protocols, e.g., Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like. Thus, the UE 110 is often referred to as a non-standalone (NSA) wireless communication device. Generally, there are many wireless communication devices operating within the various cells of the wireless communication network 100. However, only the UE 110 is illustrated for clarity purposes.

The UE 110 may be implemented as any suitable device that may be configured as a "connected device," e.g., an Internet of things (IoT) device, a machine-to-machine (M2M) device, etc. The UE 110 may also be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the UE 110 as being "mobile" (i.e., configured to be carried and moved around), it is to be appreciated that the UE 110 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UE 110 may be capable of communicating over wired networks, and/or wirelessly using any suitable wireless communications/data technology, protocol, or standard, such as those mentioned above.

As is known, according to 3GPP standards, wireless communication networks and devices may be classified as non-standalone (NSA), which generally means that the 5G networks will be supported by existing LTE infrastructure. Thus, in such scenarios, 5G enabled smart phones and other 5G enabled devices may connect to 5G frequencies for data throughput improvements, but may still use LTE for non-data duties such as talking to the base stations and servers.

When the UE 110 operates within the cell 102, the UE 110 may initially interact with the LTE base station 106 for both calls and data transmission. The UE 110 may desire to interact with both the NR base station 108 and the LTE base station 106. Thus, in configurations, the LTE base station 106 includes a signal strength schedule controller 112 for determining if the signal strength between the UE 110 and the NR base station 108 meets or exceeds a threshold. The signal strength schedule controller 112 may be included within the eNodeB, e.g., the LTE base station 106. The signal strength schedule controller 112 may be a part of the mobility management entity (MME), the serving gateway (SGW), or the packet data network gateway (PGW) of the EPC network.

The signal strength schedule controller 112 may control signal strength measurements by the UE 110 and corresponding signal strength measurement reports that are needed to determine if the UE 110 has a strong enough signal with respect to the gNodeB, e.g., the NR base station 108. Thus, when the UE 110 wishes to attach to the NR base station 108, the LTE base station 106 preliminarily configures the UE 110 for attachment to the NR base station 108, as is known. The signal strength schedule controller 112 may provide an original signal strength measurement schedule for obtaining signal strength measurement reports from the UE 110 with respect to the NR base station 108. For example, the scheduling of the signal strength measurement reports may be about once every 120 milliseconds, e.g., about eight per second. Other schedules may be used if desired. Additionally, the UE 110 may be configured with the original signal strength measurement schedule.

In configurations, the UE 110 includes an adaptive signal strength schedule controller 114. The adaptive signal strength schedule controller 114 may adapt or alter the original signal strength measurement schedule provided by the signal strength schedule controller 112. The adaptive signal strength schedule controller 114 may be included on the UE 110 in the form of an application, e.g., an app. In configurations, the adaptive signal strength schedule controller 114 may be included or be part of the signal strength schedule controller 112 of the LTE base station 106.

Thus, as will be discussed further herein, in configurations, the signal strength schedule controller 112 may provide an original signal strength measurement schedule of receiving signal strength measurement reports from the UE 110 about every 120 milliseconds until the signal strength meets or exceeds a signal strength threshold with respect to the NR base station 108. For example, the UE 110 may take a signal strength measurement with respect to the NR base station 108. The UE 110 will then send a corresponding signal strength measurement report at a first reporting point of the original signal strength measurement schedule to the LTE base station 106, e.g., the eNodeB. The signal strength measurement report may be received, in configurations, by the signal strength schedule controller 112.

If, according to the signal strength measurement report, the signal strength measurement meets or exceeds the signal strength threshold, e.g., the B1 threshold defined by IEEE, then the LTE base station 106 may send a RRC reconfiguration message to the UE 110. The UE 110 may then stop taking signal strength measurements and sending corresponding signal strength measurement reports. However, if the UE 110 does not receive the RRC reconfiguration message for some reason, e.g., the signal strength did not meet the threshold or an error occurred, then the UE 110 will continue to take the signal strength measurements and send the corresponding signal strength reports. Thus, the UE 110 will take another signal strength measurement and send another signal strength measurement report. However, in accordance with configurations, the adaptive signal strength measurement controller 114 alters, according to a predetermined pattern, the original signal strength measurement schedule provided by the signal strength schedule controller 112. For example, the pattern may be a two to the power of N based pattern. Thus, for the second measurement, the UE may skip a number of measurement reporting points. In the current two to the power of N example, since this will be the first subsequent signal strength measurement and corresponding signal strength measurement report, the UE 110 may skip two to the power of zero ($2^0$), e.g., one, reporting point. Thus, the UE 110 will take another signal strength measurement and send another corresponding signal strength measurement report at the third measurement point of the original signal strength measurement schedule, e.g., the second measurement point of the original signal strength measurement schedule will be skipped.

If the UE 110 does not receive a RRC reconfiguration message in response to the subsequent signal strength measurement report, then the UE 110 may wait or skip a number of reporting points based upon two to the first power ($2^1$), e.g., two reporting points. Thus, the subsequent signal strength measurement and corresponding signal strength measurement report may be sent after skipping two reporting points of the original signal strength measurement schedule. This may be repeated until a RRC reconfiguration message is received and the powers of two may increase until N is reached, at which time two to the N power ($2^N$) reporting points of the original signal strength measurement schedule will be skipped in between each signal strength measurement and corresponding signal strength measurement report until the RRC reconfiguration message is received. Once the RRC reconfiguration message is received, the UE 110 will stop taking signal strength measurements and stop sending signal strength measurement reports. The UE 110 may then complete attachment to the NR base station 108, as is known.

FIG. 2 illustrates a chart 200 for the adaptive scheduling of signal strength measurements and corresponding signal strength measurement reports. As can be seen, periods T1, T2, T3, and T4 are divided into eight reporting points (although only five reporting points are illustrated for T4). In configurations, T1, T2, T3, and T4 may each be one second long. However, in other configurations, T1, T2, T3, and T4 may be longer or shorter than one second. Additionally, T1, T2, T3, and T4 may be divided into more than eight reporting points or less reporting points.

As may be seen in FIG. 2, the original signal strength measurement and corresponding signal strength measurement report schedule (Original Schedule) may include a signal strength measurement and sending of a corresponding signal strength measurement report at every reporting point. However, in configurations, the scheduling of the signal strength measurements and sending of corresponding signal strength measurement reports may be altered or adapted, e.g., adapted by the adaptive signal strength schedule controller 114. Thus, as may be seen, the adaptive signal strength measurement and signal strength measurement report schedule (Adapted Schedule) may include sending a first signal strength measurement report at the first reporting point of T1. If the UE, e.g., UE 110, does not receive a RRC reconfiguration message in response to the first signal strength measurement report, then the Adapted Schedule may include skipping a two to the power of zero ($2^0$) number of reporting points, i.e., one reporting point. Thus, a subsequent signal strength measurement and sending of a corresponding signal strength measurement report may occur at the third reporting point of T1, e.g., the second reporting point is skipped. If the RRC reconfiguration message is not received by the UE 110, then the Adapted Schedule may include skipping two to the power of one ($2^1$), i.e., two, reporting points. Thus, a second signal strength measurement and signal strength measurement report may be sent after skipping two reporting points, e.g., at the sixth reporting point of T1.

If the UE, e.g., UE 110, does not receive a RRC reconfiguration message in response to the second signal strength measurement report, then the Adapted Schedule may include skipping a two to the power of two ($2^2$) number of reporting points, i.e., four reporting points. Thus, a subsequent signal strength measurement and sending of a corresponding signal strength measurement report may occur at the third reporting point of T2. If the RRC reconfiguration message is still not received by the UE 110, then the Adapted Schedule may include skipping two to the power of three ($2^3$), i.e., eight, reporting points. Thus, a subsequent signal strength measurement and signal strength measurement report may occur at the fourth reporting point of T3.

As previously noted, the Adapted Schedule may be based on a two to the power of N ($2^N$) pattern. In the example of FIG. 2, N may be 3. Thus, the maximum number of reporting points that may be skipped is eight ($2^3$). However, in other configurations, N may be greater than or less than 3, e.g., N may be in a range of 2 to 4 (or even greater than 4 or less than 2, e.g., 1). In configurations, the pattern may be based on skipping every other reporting point. Also, while the example Adapted Schedule of FIG. 2 is based on a two to the power of N pattern, in other configurations, the Adapted Schedule may be based on a three to the power of N pattern, a four to the power of N pattern, etc.

Since in the example of FIG. 2 N has been reached, e.g., $2^3$, if after the sending of the signal strength measurement report at the fourth reporting point of T3 the UE 110 does not receive the RRC reconfiguration message, then according to the Adapted Schedule, a subsequent signal strength measurement and signal strength measurement report may occur at the fifth reporting point of T4, e.g., after skipping eight reporting points. This continues, e.g., subsequent signal strength measurement and signal strength measurement report occurrences after skipping eight reporting points, until the UE 110 receives the RRC reconfiguration message. Once the RRC reconfiguration message is received, the UE 110 will stop taking signal strength measurements and stop sending signal strength measurement reports. The UE 110 may then complete attachment to the NR base station 108, as is known.

Thus, the adaptive signal strength measurement and signal strength measurement report schedule may be based on a two to the power of N ($2^N$) pattern of skipping the reporting points. Thus, after each signal strength measurement report is sent, if the RRC reconfiguration message is not received, then power for two may increase by one to determine the number of reporting points to skip. Once the maximum power of N is reached, then the Adapted Schedule may continue to skip the corresponding number ($2^N$) of reporting points until a RRC reconfiguration message is received to configure UE to stop such measurement and report. For example, if N equals three, then once ($2^3$) reporting points, e.g., eight reporting points, is reached for skipping, then every time a new signal strength measurement and sending of a corresponding signal strength measurement report is needed, eight reporting points will be skipped.

In configurations, the UE 110 may follow the Original Schedule provided by the LTE base station 106 and then, if after a predetermined amount of time, e.g., two or three seconds, then the UE 110 may begin to send signal strength measurement reports according to the Adapted Schedule as described herein. Also, in configurations the signal strength schedule controller 112 of the LTE base station 106 may adapt or alter the Original Schedule to provide the Adapted Schedule, e.g., the adaptive signal strength schedule controller 114 may be part of the signal strength schedule controller 112.

While the present disclosure has been described with respect to signal strength measurements and signal strength measurement reports for the UE 110 attaching to the NR base station 108, the techniques and architecture described herein may be also be useful for signal strength measurements and corresponding signal strength measurement reports with respect to other measurement report triggering events. For example, Table 1 below provides an example of 3GPP 36.331 5.5.4 measurement report triggering events for which the techniques and architecture described herein may be useful.

TABLE 1

| Event Type | Description |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better thanthreshold2 |
| Event A6 | Neighbor become offset better than S Cell (This event is introduced in Release 10 for CA) |
| Event B1 | Inter RAT neighbor becomes better than threshold |
| Event B1-NR | NR neighbor becomes better than threshold |
| Event B2 | Serving becomes worse than threshold1 and inter RAT neighbor becomes better than threshold2 |
| Event B2-NR | Serving becomes worse than threshold1 and NR neighbor becomes better than threshold2 |
| Event C1 | CSI-RS resource becomes better than threshold |
| Event C2 | CSI-RS resource becomes offset better than reference CSI-RS resource |
| Event W1 | WLAN becomes better than a threshold |
| Event W2 | All WLAN inside WLAN mobility set becomes worse than threshold1 and a WLAN outside WLAN mobility set becomes better than threshold2 |
| Event W3 | All WLAN inside WLAN mobility set becomes worse than a threshold |
| Event V1 | The channel busy ratio is above a threshold |
| Event V2 | The channel busy ratio is below a threshold |
| Event H1 | The Aerial UE height is above a threshold |
| Event H2 | The channel busy ratio is below a threshold |

Figure 3:
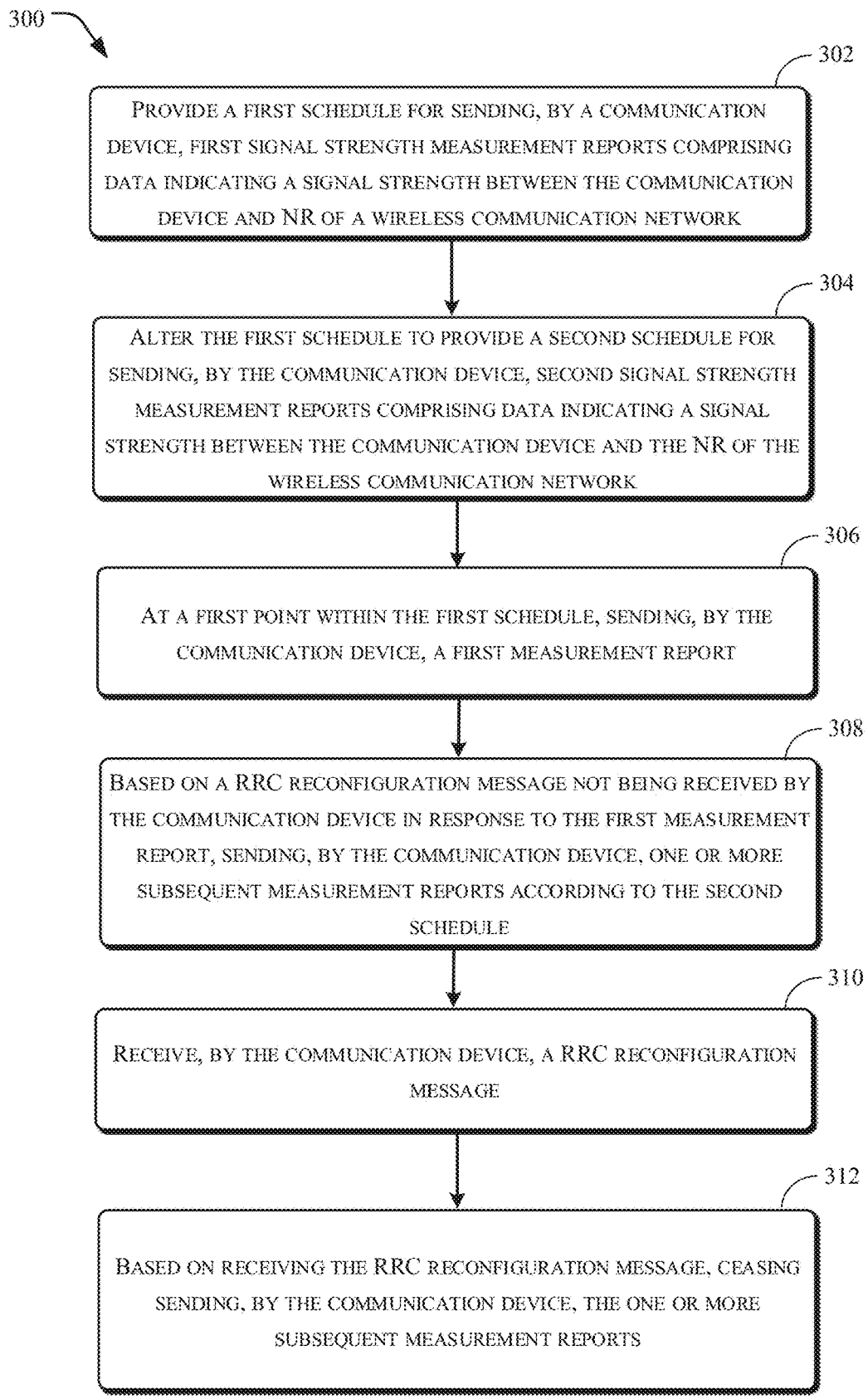
FIG. 3 is a flow diagram of an example process for adaptive scheduling of signal strength measurements and corresponding signal strength measurement reports for UEs in the wireless communication network of FIG. 1, in accordance with various configurations.

FIG. 3 is a flow diagram of an example process 300 for adaptive scheduling of signal strength measurements and corresponding signal strength measurement reports for UEs, e.g., UE 110, in a wireless communication network, e.g., wireless communication network 100. At block 302, a first schedule for sending first signal strength measurement reports by a communication device is provided. The first signal strength measurement reports comprise data indicating a signal strength between the communication device and a radio of a wireless communication network. The radio configured as a New Radio (NR) and the first schedule defines a first pattern of N reporting points. At block 304, the first schedule is altered to provide a second schedule for sending, by the communication device, second signal strength measurement reports. The second signal strength measurement reports comprise data indicating a signal strength between the communication device and the radio of the wireless communication network. The second schedule defines a second pattern of sending fewer reporting points in a same time period than the first pattern.

At block 306, at a first point within the first schedule, the communication device sends a first measurement report comprising data indicating a first signal strength measurement between the communication device and the radio. At block 308, based on a RRC reconfiguration message not being received by the communication device in response to the first measurement report, the communication device sends one or more subsequent measurement reports according to the second schedule. Each subsequent measurement report comprising data indicating a corresponding subsequent signal strength measurement between the communication device and the radio.

At block 310, the communication device receives a RRC reconfiguration message. At block 312, based on receiving the RRC reconfiguration message, the communication device ceases sending the one or more subsequent measurement reports.

Figure 4:
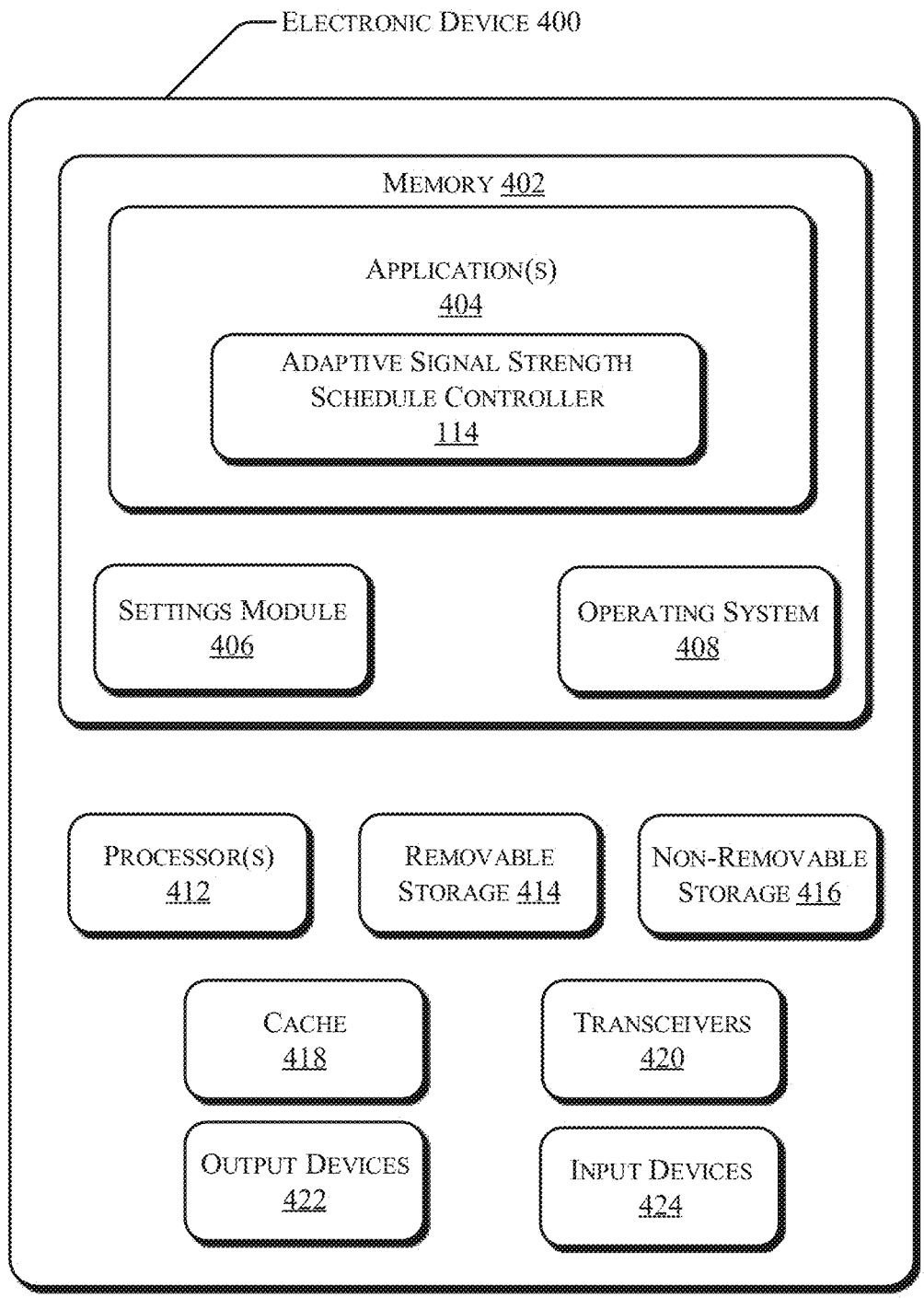
FIG. 4 schematically illustrates a component level view of an example electronic device configured for use in the wireless communication network of FIG. 1, in accordance with various configurations.

FIG. 4 schematically illustrates a component level view of an example electronic device 400, such as UE 110, configured to function within wireless communication network 100. The electronic device 400 may include more or less components depending on the type of electronic device. As illustrated, the electronic device 400 comprises a system memory 402, e.g., computer-readable media, storing application(s) 404. For example, the system memory 402 may include an application configured to implement the adaptive signal strength schedule controller 114. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
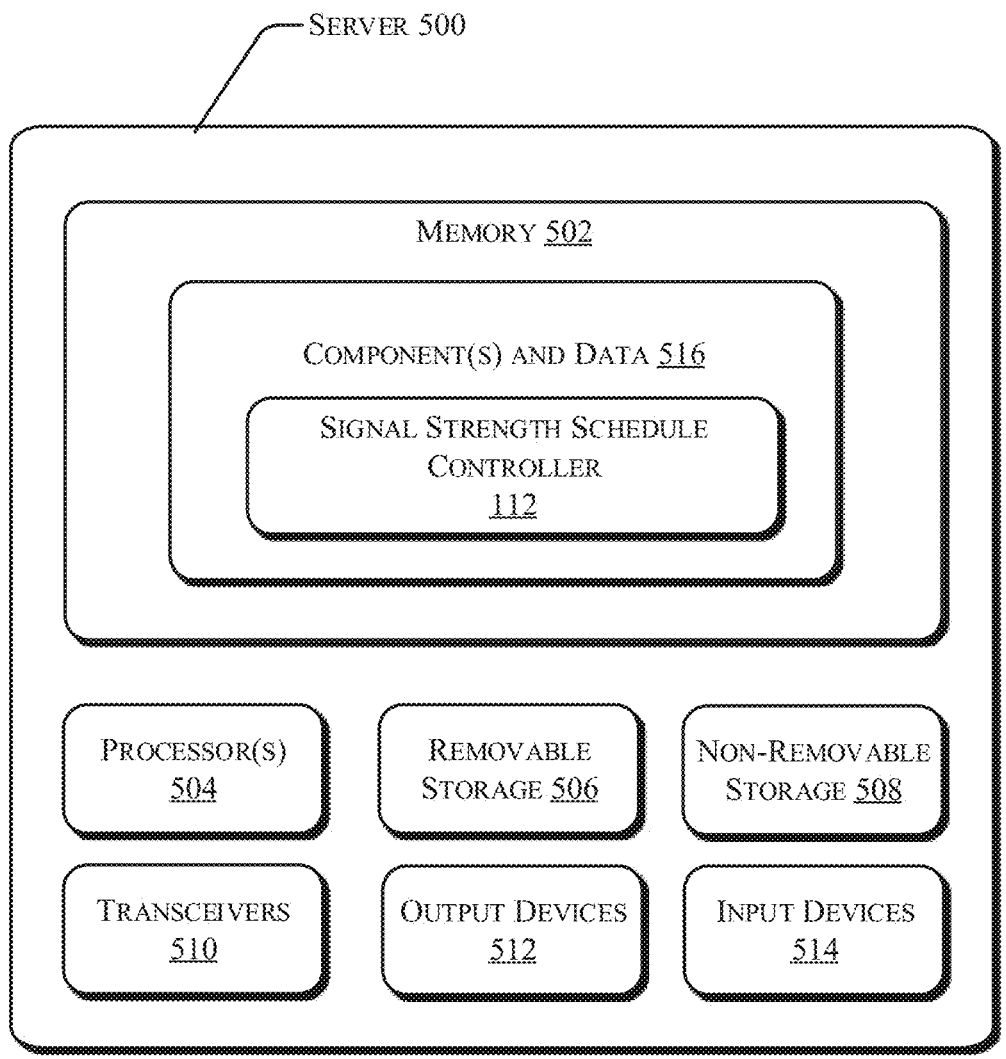
FIG. 5 schematically illustrates a component level view of a server configured for use in the cell of FIG. 1 to provide various services of the cell of the wireless communication network of FIG. 1, in accordance with various configurations.

FIG. 5 illustrates a component level view of a server 500 configured for use within a wireless communication network, e.g., wireless communication network 100, in order to provide various services within the wireless communication network, according to the techniques described herein. For example, one or more servers 500 may be configured to operate as an eNodeB, e.g., the LTE base station 106, while one or more servers 500 may be configured to operate as a gNodeB, e.g., the NR base station 108. As illustrated, the server 500 comprises a system memory 502 that may store one or more components and/or applications and data 516 for interacting with electronic devices 400, e.g., UE 110, or other electronic devices that may be configured as connected devices, as described herein. For example, the system memory 502 may include one or more components and/or applications configured to implement the signal strength schedule controller 112. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
providing a first schedule for sending, by a communication device, first signal strength measurement reports comprising data indicating a signal strength between the communication device and a radio of a wireless communication network, the radio configured as a New Radio (NR), and the first schedule defining a first pattern of N reporting points;
altering the first schedule to provide a second schedule for sending, by the communication device, second signal strength measurement reports comprising data indicating a signal strength between the communication device and the radio of the wireless communication network, the second schedule defining a second pattern of sending fewer reporting points in a same time period than the first pattern;
at a first point within the first schedule, sending, by the communication device, a first measurement report comprising data indicating a first signal strength measurement between the communication device and the radio;
based on a radio resource control (RRC) reconfiguration message not being received by the communication device in response to the first measurement report, sending, by the communication device, one or more subsequent measurement reports according to the second schedule, each subsequent measurement report comprising data indicating a corresponding subsequent signal strength measurement between the communication device and the radio;
receiving, by the communication device, a RRC reconfiguration message; and
based on receiving the RRC reconfiguration message, ceasing sending, by the communication device, the one or more subsequent measurement reports,
wherein the second pattern comprises either:
skipping every other reporting point, with respect to the first pattern, or skipping an increasing number of reporting points between sending of subsequent signal strength measurement reports, with respect to the first pattern.

2. The method of claim 1, wherein the increasing number of reporting points is based on a range of 2 to the power of 0 to M.

3. The method of claim 2, wherein once M reporting points are sent, sending one or more subsequent measurement reports according to the second schedule comprises sending one or more subsequent measurement reports and skipping $2^M$ reporting points between subsequent measurement reports, with respect to the first pattern.

4. The method of claim 3, wherein M is in a range of 2 to 4.

5. The method of claim 4, wherein M equals 3.

6. The method of claim 1, wherein the first schedule defines the first pattern as N reporting points per second.

7. A non-transitory storage medium comprising instructions stored thereon, the instructions being executable by one or more processors to perform actions comprising
providing a first schedule for sending, by a communication device, first signal strength measurement reports comprising data indicating a signal strength between the communication device and a radio of a wireless communication network, the radio configured as a New Radio (NR), and the first schedule defining a first pattern of N reporting points;
altering the first schedule to provide a second schedule for sending, by the communication device, second signal strength measurement reports comprising data indicating a signal strength between the communication device and the radio of the wireless communication network, the second schedule defining a second pattern of sending fewer reporting points in a same time period than the first pattern;
at a first point within the first schedule, sending, by the communication device, a first measurement report comprising data indicating a first signal strength measurement between the communication device and the radio;
based on a radio resource control (RRC) reconfiguration message not being received by the communication device in response to the first measurement report, sending, by the communication device, one or more subsequent measurement reports according to the second schedule, each subsequent measurement report comprising data indicating a corresponding subsequent signal strength measurement between the communication device and the radio;
receiving, by the communication device, a RRC reconfiguration message; and
based on receiving the RRC reconfiguration message, ceasing sending, by the communication device, one or more subsequent measurement reports,
wherein the second pattern comprises either:
skipping every other reporting point, with respect to the first pattern, or
skipping an increasing number of reporting points between sending of subsequent signal strength measurement reports, with respect to the first pattern.

8. The non-transitory storage medium of claim 7, wherein the increasing number of reporting points is based on a range of 2 to the power of 0 to M.

9. The non-transitory storage medium of claim 8, wherein once M reporting points are sent, sending one or more subsequent measurement reports according to the second schedule comprises sending one or more subsequent measurement reports and skipping $2^M$ reporting points between subsequent measurement reports, with respect to the first pattern.

10. The non-transitory storage medium of claim 9, wherein M is in a range of 2 to 4.

11. The non-transitory storage medium of claim 7, wherein M equals 3.

12. An apparatus comprising:
one or more processors; and
a non-transitory storage medium comprising instructions stored thereon, the instructions being executable by the one or more processors to cause the processors to perform one or more actions comprising:
providing a first schedule for sending, by a communication device, first signal strength measurement reports comprising data indicating a signal strength between the communication device and a radio of a wireless communication network, the radio configured as a New Radio (NR), and the first schedule defining a first pattern of N reporting points;
altering the first schedule to provide a second schedule for sending, by the communication device, second signal strength measurement reports comprising data indicating a signal strength between the communication device and the radio of the wireless communication network, the second schedule defining a second pattern of for sending fewer reporting points in a same time period than the first pattern;
at a first point within the first schedule, sending, by the communication device, a first measurement report comprising data indicating a first signal strength measurement between the communication device and the radio;
based on a radio resource control (RRC) reconfiguration message not being received by the communication device in response to the first measurement report, sending, by the communication device, one or more subsequent measurement reports according to the second schedule, each subsequent measurement report comprising data indicating a corresponding subsequent signal strength measurement between the communication device and the radio;
receiving, by the communication device, a RRC reconfiguration message; and
based on receiving the RRC reconfiguration message, ceasing sending, by the communication device, one or more subsequent measurement reports,
wherein the second pattern comprises either:
skipping every other reporting point, with respect to the first pattern, or
skipping an increasing number of reporting points between sending of subsequent signal strength measurement reports, with respect to the first pattern.

13. The apparatus of claim 12, wherein the increasing number of reporting points is based on a range 2 to the power of 0 to M.

14. The apparatus of claim 13, wherein once M reporting points are sent, sending one or more subsequent measurement reports according to the second schedule comprises sending one or more subsequent measurement reports and skipping $2^M$ reporting points between subsequent measurement reports, with respect to the first pattern.

* * * * *